United States Patent [19]

Finlayson et al.

[11] Patent Number: 4,742,098
[45] Date of Patent: May 3, 1988

[54] ORGANOPHILIC CLAY GELLANTS AND PROCESS FOR PREPARATION

[75] Inventors: Claude M. Finlayson, Cranbury; Charles A. Cody, Robbinsville; Steven J. Kemnetz, Trenton; William W. Reichert, Freehold; Edward D. Magauran, Mount Holly; Johnny R. Johnson, Freehold, all of N.J.

[73] Assignee: NL Chemicals, Inc., Hightstown, N.J.

[21] Appl. No.: 60,082

[22] Filed: Jun. 9, 1987

Related U.S. Application Data

[62] Division of Ser. No. 767,599, Aug. 20, 1985, Pat. No. 4,695,402.

[51] Int. Cl.$^4$ ............................................ C08L 67/00
[52] U.S. Cl. ................................ 523/514; 106/308 N; 252/315.2
[58] Field of Search .................. 523/514; 106/308 N; 252/315.2

[56] References Cited

U.S. PATENT DOCUMENTS

| | | | |
|---|---|---|---|
| 2,033,856 | 3/1936 | Smith | 546/10 |
| 2,531,427 | 11/1950 | Hauser | 556/9 |
| 2,548,679 | 4/1951 | Olin | 564/285 |
| 2,622,987 | 12/1952 | Ratcliffe . | |
| 2,658,869 | 11/1953 | Stross et al. | 252/28 |
| 2,739,067 | 3/1956 | Ratcliffe | 106/30 |
| 2,750,296 | 6/1956 | Curado et al. | 106/30 |
| 2,754,219 | 7/1956 | Voet et al. | 106/32 |
| 2,767,177 | 10/1956 | Erickson | 556/173 |
| 2,859,234 | 11/1958 | Clem | 44/7.6 |
| 2,885,360 | 5/1959 | Haden et al. | 252/28 |
| 2,966,506 | 12/1960 | Jordan | 556/173 |
| 3,461,163 | 8/1969 | Boothe | 564/296 |
| 3,472,740 | 10/1969 | Boothe | 203/37 |
| 3,516,959 | 6/1970 | Jonas | 524/428 |
| 3,537,994 | 11/1970 | House | 252/13 |
| 3,929,849 | 12/1975 | Oswald | 556/9 |
| 3,945,836 | 3/1976 | Miyata | 106/22 |
| 4,054,537 | 10/1977 | Wright et al. | 423/331 |
| 4,097,437 | 6/1978 | Dhake | 524/236 |
| 4,193,806 | 3/1980 | Finlayson . | |
| 4,317,737 | 3/1982 | Oswald et al. | 252/28 |
| 4,365,030 | 12/1982 | Oswald et al. | 523/521 |
| 4,475,950 | 10/1984 | Finlayson . | |
| 4,569,923 | 2/1986 | Knudson, Jr. et al. | 106/308 N |

FOREIGN PATENT DOCUMENTS

| | | |
|---|---|---|
| 0133071 | 2/1983 | European Pat. Off. . |
| 2912070 | 10/1979 | Fed. Rep. of Germany ...... 523/521 |
| 1106281 | 3/1968 | United Kingdom . |
| 1592271 | 7/1981 | United Kingdom . |

OTHER PUBLICATIONS

Farrow et al, "Organophilic Swelling Bentonite Clays as Thixotropes for Unsaturated Polyester/Styrene...", Soc. of Phy. Ind., 2-83, Session 8-B, pp. 1-7.

"A Rheological Additive for Unsaturated Polyester Resin Applications", Claytone P. S., So. Clay Products, pamphlet.

Finlayson, "Homoionic Montmorillonite Slurry—Effect of High Shear on Availability of Cation Exchange Sites and of Surface Area to a Large Organic Cation", Oct. 1980.

Primary Examiner—Joseph L. Schofer
Assistant Examiner—N. Sarafim
Attorney, Agent, or Firm—Burns, Doane, Swecker & Mathis

[57] ABSTRACT

Improved organophilic clay gellants can be prepared by a process wherein the smectite-type clay is subjected to shearing in order to break apart the agglomerates and/or the smectite-type clay can be reacted with organic cation and, possibly organic anion, under dilute reaction conditions. The reaction product is recovered using gentle drying conditions. Depending in large part on its composition, the organophilic clay gellant may be used to thicken a variety of organic compositions. In a preferred aspect, the organophilic clay gellant can be directly added to polyester compositions in order to efficiently and effectively increase the viscosity thereof or can be first formed into a pregel under low shear conditions to yield even higher efficiencies.

10 Claims, No Drawings

ORGANOPHILIC CLAY GELLANTS AND PROCESS FOR PREPARATION

This application is a divisional of application Ser. No. 767,599, filed Aug. 20, 1985, now U.S. Pat. No. 4,695,402.

BACKGROUND OF THE INVENTION

1. Field of the Invention

The present invention relates to a process for preparing organophilic clay gellants in general and a process for preparing an organophilic clay gellant which is particularly useful for thickening polyester compositions. The present invention also relates to organophilic clay gellants which may be prepared by the processes and to a process for thickening a polyester composition.

2. Background of the Invention

It is well known in the art that organophilic clays can be used to thicken a variety of organic compositions. A problem which is often encountered in using organophilic clay gellants is that to obtain the desired level of thickening, it is necessary to disperse the gellant thoroughly in the composition. Otherwise, a much greater amount of organophilic clay gellant is needed and/or the organophilic clay particles may be larger than other particles (e.g., pigment) present in the composition thereby leading to adverse results (e.g., an unattractive rough coating or settling of the particles).

In an effort to achieve proper dispersion of the organophilic clay gellant, the art has explored various avenues. For example, certain organophilic clay gellants, such as shown in U.S. Pat. No. 2,531,440, were mixed with the organic composition to be thickened and the mixture subjected to high shear conditions. Alternatively, low molecular weight polar organic materials known as polar activators, dispersants, dispersion aids, solvating agents, dispersion agents and the like, have been combined with the organophilic clay gellant in order to achieve dispersion into the organic composition. Illustrative patents which disclose these materials are U.S. Pat. Nos. 2,677,661, 2,704,276, 2,833,720, 2,879,229, 2,966,506 and 3,294,683.

More recently, organophilic clay gellants have been developed which are the reaction products of certain types of clays having a cation exchange capacity with certain organic cations or organic cations and organic anions. These gellants have the advantage that in some organic compositions they can be effectively dispersed without a dispersion aid under normal shear conditions. Illustrative patents which describe such improved organophilic clay gellants are U.S. Pat. Nos. 4,105,578, 4,208,218, 4,287,086, 4,391,637, 4,410,364, 4,412,018, 4,434,075, 4,434,076, 4,450,095 and 4,517,112.

One type of organic composition which has provided a particularly difficult environment in which to achieve effective and efficient dispersion of the organophilic clay gellant are polyester compositions. In the past, polyester compositions have been thickened using asbestos, fumed silica and certain types of organophilic clays. Each of these materials has certain drawbacks. Specifically, asbestos is known to present significant health hazards. Fumed silica forms a dust when handled, yields batch to batch variation in viscosity and will actually lose viscosity and performance if oversheared. Additionally, fumed silica often reduces the clarity and shelf life of the polyester composition.

If an organophilic clay gellant is used to thicken polyester compositions, the dispersion of the gellant has been achieved by preparing a pregel under high shear conditions which is comprised of the gellant, an unsaturated monomer, such as styrene, and possibly a polar solvent. Such a technique is described in U.S. Pat. Nos. 3,974,125, 4,081,496 and 4,216,135. U.S. Pat. No. 4,240,951 also describes the use of organophilic clay gellants, such as prepared from dimethyl dihydrogenated tallow ammonium salts and dimethyl benzyl hydrogenated tallow ammonium salts, which can allegedly be added by direct addition, but is preferably added via the formation of a pregel. However, the patent further states that in this instance, numerous experiments are needed to determine what is referred to as the optimum level of the organic cation on the clay.

OBJECTS AND SUMMARY OF THE INVENTION

Accordingly, it is a general object of the present invention to provide an improved organophilic clay gellant and a process for its preparation.

It is a more specific object of the present invention to provide a process for preparing an organophilic clay gellant which may be efficiently and effectively incorporated into organic compositions.

It is another object of the present invention to provide a process for preparing an organophilic clay gellant that can be added into organic compositions in the absence of a dispersion agent.

It is a further object of the present invention to provide a process for preparing an organophilic clay gellant that can be directly added into organic compositions, especially polyester compositions, without the formation of a pregel.

It is a further object of the present invention to provide a process for preparing an organophilic clay gellant that can be directly added into polyester compositions, but which exhibits improved performance when initially formed into a pregel.

It is a still further object of the present invention to provide a process for preparing an organophilic clay gellant that provides consistent results and does not provide health hazards.

It is a yet further object of the present invention to provide an improved organophilic clay gellant with one or more of the advantages referred to in the foregoing objects of the invention.

In one aspect, the present invention provides a process for preparing an organophilic clay gellant. The process comprises:

(a) preparing a slurry of smectite-type clay having a cation exchange capacity of at least 75 milliequivalents per 100 grams of clay;

(b) subjecting the slurry to high shear conditions whereby clay agglomerates are separated;

(c) reacting the smectite-type clay with organic cation in an amount ranging from about 90 to about 150% of the cation exchange capacity of the smectite-type clay whereby at least some of the cation exchange sites of the smectite-type clay are substituted with organic cation thereby forming an organophilic clay gellant;

(d) separating the organophilic clay gellant from the slurry; and (e) drying the organophilic clay gellant under conditions selected such that the temperature of the wet organophilic clay gellant does not exceed about 50° C.

In another aspect, the present invention provides a process for preparing an organophilic clay gellant which comprises:

(a) preparing a slurry of smectite-type clay having a cation exchange capacity of at least 75 milliequivalents per 100 grams of clay wherein the slurry contains from about 0.5 to 2.5% by weight of the smectite-type clay;

(b) reacting the smectite-type clay with organic cation in an amount ranging from about 90 to about 150% of the cation exchange capacity of the smectite-type clay whereby at least some of the cation exchange sites of the smectite-type clay are substituted with organic cation thereby forming an organophilic clay gellant;

(c) separating the organophilic clay gellant from the slurry; and (d) drying the organophilic clay gellant under conditions selected such that the temperature of the wet organophilic clay does not exceed about 50° C.

In a further aspect, the present invention provides a process for preparing an organophilic clay gellant. The process comprises:

(a) preparing a slurry of smectite-type clay having a cation exchange capacity of at least 75 milliequivalents per 100 grams of clay;

(b) subjecting the slurry to high shear conditions whereby clay agglomerates are separated;

(c) reacting the smectite-type clay with organic cation in an amount ranging from about 90 to about 150% of the cation exchange capacity of the smectite-type clay whereby at least some of the cation exchange sites of the smectite-type clay are substituted with organic cation thereby forming an organophilic clay gellant;

(d) separating the organophilic clay gellant from the slurry; and (e) drying the organophilic clay gellant.

In a still further aspect, the present invention provides a process for preparing an organophilic clay gellant for polyester compositions. The process comprises:

(a) preparing a slurry of smectite-type clay having a cation exchange capacity of at least 75 milliequivalents per 100 grams of clay;

(b) subjecting the slurry to high shear conditions whereby clay agglomerates are separated;

(c) diluting the sheared slurry such that the slurry contains from about 0.5 to about 2.5% by weight of the smectite-type clay;

(d) adding to the slurry organic cation containing at least one lineal or branched, saturated or unsaturated alkyl group having 12 to 22 carbon atoms, at least one lineal or branched, saturated or unsaturated alkyl group having 1 to 12 carbon atoms and at least one aralkyl group having lineal or branched 1 to 12 carbons in the alkyl portion, said organic cation being in an amount ranging from about 90 to about 150% of the cation exchange capacity of the smectite-type clay and organic anion having a pKa less than about 11.0 in an amount such that the milliequivalent ratio of the organic cation to the organic anion is in the range of from about 1.70:1.0 to about 28:1.0 whereby at least some of the cation exchange sites of the smectite-type clay are substituted with organic cation and at least some of the organic anion forms a complex with organic cation which is intercalated with the smectite-type clay thereby forming an organophilic clay gellant;

(e) separating the organophilic clay gellant from the slurry; and (f) drying the organophilic clay gellant under conditions selected such that the temperatures of the wet organophilic clay gellant does not exceed about 50° C.

In other aspects, the present invention provides other processes for preparing organophilic clay gellants and organophilic clay gellants useful for thickening organic compositions in general and polyester compositions in particular.

Further advantages and features of the invention as well as the scope, nature and utilization of the invention will become apparent to those skilled in the art from the description of the preferred embodiments of the invention set forth below.

DESCRIPTION OF THE PREFERRED EMBODIMENTS

As stated hereinabove, the present invention relates to a process for preparing an organophilic clay gellant. The organophilic clay gellant is prepared by reacting a certain type of clay with an organic cation and may be prepared by reacting both an organic cation and an organic anion with the clay under defined process steps.

The clay which is used in the present invention is a smectite-type clay having a cationic exchange capacity of at least about 75 milliequivalents per 100 grams of clay as determined by the well known ammonium acetate method. The smectite-type clays are well known in the art and are available from a variety of sources. The clays are preferably converted to the sodium form if they are not already in this form. This can conveniently be done by preparing an aqueous clay slurry and passing the slurry through a bed of cation exchange resin in the sodium form. Alternatively, the clay can be mixed with water and a soluble sodium compound, such as sodium carbonate, sodium hydroxide, etc., and the mixture sheared, such as with a pugmill or extruder. Conversion of the clay to the sodium form can be undertaken at any point before reaction with the organic cation and, if present, the organic anion.

Smectite-type clays prepared synthetically by either a pneumatolytic or, preferably, a hydrothermal synthesis process can also be used to prepare these novel organic clay complexes.

Representative of smectite-type clays useful in the present invention are the following:

Montmorillonite $[(Al_{4-x}Mg_x)Si_8O_{20}(OH)_{4-f}F_f]xR^+$ where $0.55 \leq x \leq 1.10$, $f \leq 4$ and R is selected from the group consisting of Na, Li, NH$_4$, and mixtures thereof;

Bentonite $[(Al_{4-x}Mg_x)(Si_{8-y}Al_y)O_{20}(OH)_{4-f}F_f](x+y)R^+$ where $0 < x < 1.10$, $0 < y < 1.10$, $0.55 \leq (x+y) \leq 1.10$, $f \leq 4$ and R is selected from the group consisting of Na, Li, NH$_4$ and mixtures thereof;

Beidellite $[(Al_{4+y})(Si_{8-x-y}Al_{x+y})O_{20}(OH)_{4-f}F_f]xR^+$ where $0.55 \leq x \leq 1.10$, $0 \leq y \leq 0.44$, $f \leq 4$ and R is selected from the group consisting of Na, Li, NH$_4$ and mixtures thereof;

Hectorite $[(Mg_{6-x}Li_x)Si_8O_{20}(OH)_{4-f}F_f]xR^+$ where $0.57 \leq x \leq 1.15$, $f \leq 4$ and R is selected from the group consisting of Na, Li, NH$_4$, and mixtures thereof;

Saponite $$[(Mg_{6-y}Al_y)(Si_{8-x-y}Al_{x+y})O_{20}(OH)_{4-f}F_f]xR^+$$

where $0.58 \leq x \leq 1.18$, $0 \leq y \leq 0.66$, $f \leq 4$ and R is selected from the group consisting of Na, Li, NH$_4$, and mixtures thereof;

Stevensite $$[(Mg_{6-x})Si_8O_{20}(OH)_{4-f}F_f]2xR^+$$

where $0.28 \leq x \leq 0.57$, $f=4$ and R is selected from the group consisting of Na, Li, NH$_4$, and mixtures thereof.

The preferred clays used in the present invention are bentonite and hectorite with bentonite being the most preferred.

The clays may be synthesized hydrothermally by forming an aqueous reaction mixture in the form of a slurry containing mixed hydrous oxides or hydroxides of the desired metals with or without, as the case may be, sodium or (alternate exchangeable cation or mixture thereof) fluoride in the proportions defined by the above formulas and the preselected values of x, y and f for the particular synthetic smectite desired. The slurry is then placed in an autoclave and heated under autogenous pressure to a temperature within the range of approximately 100° to 325° C., preferably 275° to 300° C., for a sufficient period of time to form the desired product. Formulation times of 3 to 48 hours are typical at 300° C. depending on the particular smectite-type clay being synthesized and the optimum time can readily be determined by pilot trials.

Representative hydrothermal processes for preparing synthetic smectite clays are described in U.S. Pat. Nos. 3,252,757, 3,586,478, 3,666,407, 3,671,190, 3,844,978, 3,844,979, 3,852,405 and 3,855,147, all of which are herein incorporated by reference.

The organic cation which is reacted with the smectite-type clay must have a positive charge localized on a single atom or on a small group of atoms within the compound. The organic cation is preferably an ammonium cation which contains at least one lineal or branched, saturated or unsaturated alkyl group having 12 to 22 carbon atoms. The remaining groups of the cation are chosen from (a) lineal or branched alkyl groups having 1 to 22 carbon atoms; (b) aralkyl groups which are benzyl and substituted benzyl moieties including fused ring moieties having lineal or branched 1 to 22 carbon atoms in the alkyl portion of the structure; (c) aryl groups such as phenyl and substituted phenyl including fused ring aromatic substituents; (d) beta, gamma unsaturated groups having six or less carbon atoms or hydroxyalkyl groups having two to six carbon atoms; and (e) hydrogen.

The long chain alkyl radicals may be derived from natural occurring oils including various vegetable oils, such as corn oil, coconut oil, soybean oil, cottonseed oil, castor oil and the like, as well as various animal oils or fats such as tallow oil. The alkyl radicals may likewise be petrochemically derived such as from alpha olefins.

Representative examples of useful branched, saturated radicals include 12-methylstearyl; and 12-ethylstearyl. Representative examples of useful branched, unsaturated radicals include 12-methyloleyl and 12-ethyloleyl. Representative examples of unbranched saturated radicals include lauryl; stearyl; tridecyl; myristyl (tetradecyl); pentadecyl; hexadecyl; hydrogenated tallow, docosanyl. Representative examples of unbranched, unsaturated and unsubstituted radicals include oleyl, linoleyl, linolenyl, soya and tallow.

Additional examples of aralkyl, that is benzyl and substituted benzyl moieties would include those materials derived from, e.g. benzyl halides, benzhydryl halides, trityl halides, α-halo-α-phenylalkanes wherein the alkyl chain has from 1 to 22 carbon atoms, such as 1-halo-1-phenylethane, 1-halo-1-phenyl propane, and 1-halo-1-phenyloctadecane; substituted benzyl moieties, such as would be derived from ortho, meta and para-chlorobenzyl halides, para-methoxybenzyl halides, ortho, meta and para-nitrilobenzyl halides, and ortho, meta and para-alkylbenzyl halides wherein the alkyl chain contains from 1 to 22 carbon atoms; and fused ring benzyl-type moieties, such as would be derived from 2-halomethylnaphthalene, 9-halomethylanthracene and 9-halomethylphenanthrene, wherein the halo group would be defined as chloro, bromo, iodo, or any other such group which serves as a leaving group in the nucleophilic attack of the benzyl type moiety such that the nucleophilic replaces the leaving group on the benzyl type moiety.

Examples of aryl groups would include phenyl such as in N-alkyl and N,N-dialkyl anilines, wherein the alkyl groups contain between 1 and 22 carbon atoms; ortho, meta and paranitrophenyl, ortho, metal and para-alkyl phenyl, wherein the alkyl group contains between 1 and 22 carbon atoms, 2-, 3-, and 4-halophenyl wherein the halo group is defined as chloro, bromo, or iodo, and 2-, 3-, and 4-carboxyphenyl and esters thereof, where the alcohol of the ester is derived from an alkyl alcohol, wherein the alkyl group contains between 1 and 22 carbon atoms, aryl such as a phenol, or aralkyl such as benzyl alcohols; fused ring aryl moieties such as naphthalene, anthracene, and phenanthrene.

The $\beta,\gamma$-unsaturated alkyl group may be selected from a wide range of materials. These compounds may be cyclic or acyclic, unsubstituted or substituted with aliphatic radicals containing up to 3 carbon atoms such that the total number of aliphatic carbons in the $\beta,\gamma$-unsaturated radical is 6 or less. The $\beta,\gamma$-unsaturated alkyl radical may be substituted with an aromatic ring that likewise is conjugated with the unsaturation of the $\beta,\gamma$ moiety or the $\beta,\gamma$-radical is substituted with both aliphatic radicals and aromatic rings.

Representative examples of cyclic $\beta,\gamma$-unsaturated alkyl groups include 2-cyclohexenyl and 2-cyclopentenyl. Representative examples of acyclic $\beta,\gamma$-unsaturated alkyl groups containing 6 or less carbon atoms include propargyl; allyl(2-propenyl); crotyl(2-butenyl); 2-pentenyl; 2-hexenyl; 3-methyl-2-butenyl; 3-methyl-2-pentenyl; 2,3-dimethyl-2-butenyl; 1,1-dimethyl-2-propenyl; 1,2-dimethyl propenyl; 2,4-pentadienyl; and 2,4-hexadienyl. Representative examples of acyclic-aromatic substituted compounds include cinnamyl(3-phenyl-2-propenyl); 2-phenyl-2-propenyl; and 3-(4methoxyphenyl)-2-propenyl. Representative examples of aromatic and aliphatic substituted materials include 3-phenyl-2-cyclohexenyl; 3-phenyl-2-cyclopentenyl; 1,1-dimethyl-3-phenyl-2-propenyl; 1,1,2-trimethyl-3-phenyl-2-propenyl; 2,3-dimethyl-3-phenyl-2-propenyl; 3,3-dimethyl-2-phenyl-2-propenyl; and 3-phenyl-2-butenyl.

The hydroxyalkyl group is selected from a hydroxyl substituted aliphatic radical wherein the hydroxyl is not substituted at the carbon adjacent to the positively charged atom, and the group has from 2 to 6 aliphatic carbons. The alkyl group may be substituted with an aromatic ring independently from the 2 to 6 aliphatic carbons. Representative examples include 2-hydroxyethyl (ethanol); 3-hdroxypropyl; 4-hydroxypentyl; 6-hydroxyhexyl; 2-hydroxypropyl (isopropanol); 2-hydroxybutyl; 2-hydroxypentyl; 2-hydroxyhexyl; 2-hydroxycyclohexyl; 3-hydroxycyclohexyl; 4-hydroxycyclohexyl; 2-hydroxycyclopentyl; 3-hydroxycyclopentyl; 2-methyl-2-hydroxypropyl; 1,1,2-trimethyl-2-hydroxypropyl; 2-phenyl-2-hydroxyethyl; 3-methyl-2-hydroxybutyl; and 5-hydroxy-2-pentenyl.

The organic cation can thus be considered as having at least one of the following formulae:

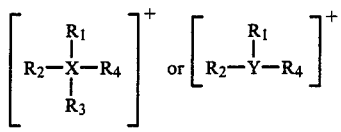

wherein X is nitrogen or phosphorus, Y is sulfur, $R_1$ is the long chain alkyl group and $R_2$, $R_3$ and $R_4$ are representative of the other possible groups described above.

A preferred organic cation contains at least one lineal or branched, saturated or unsaturated alkyl group having 12 to 22 carbon atoms, at least one lineal or branched, saturated or unsaturated alkyl group having 1 to 12 carbon atoms and at least one aralkyl group having lineal or branched, saturated or unsaturated alkyl group having 1 to 12 carbons in the alkyl portion.

An especially preferred organic cation is an ammonium cation where $R_1$ is hydrogenated tallow, $R_2$ is benzyl and $R_3$ and $R_4$ are methyl.

The amount of organic cation reacted with the smectite-type clay depends upon the specific clay and the desired degree of hydrophobicity. Typically, the amount of cation ranges from about 90 to about 150%, preferably from about 100 to about 130% of the cation exchange capacity of the clay. Thus, for example, when bentonite is used, the amount of cation reacted with the clay will range from about 85 to about 143 milliequivalents, preferably from about 95 to about 124 milliequivalents per 100 grams of clay, 100% active basis.

The anion which will normally accompany the organic cation is typically one which will not adversely affect the reaction product or the recovery of the same. Such anions may be exemplified by chloride, bromide, iodide, hydroxyl, nitrite and acetate in amounts sufficient to neutralize the organic cation.

The preparation of the organic cationic salt (i.e., the organic cation paired with the anion) can be achieved by techniques well known in the art. For example, when preparing a quaternary ammonium salt, one skilled in the art would prepare a dialkyl secondary amine, for example, by the hydrogenation of nitriles, see U.S. Pat. No. 2,355,356, and then form the methyl dialkyl tertiary amine by reductive alkylation using formaldehyde as a source of the methyl radical. According to procedures set forth in U.S. Pat. No. 3,136,819 and U.S. Pat. No. 2,775,617, quaternary amine halide may then be formed by adding benzyl chloride or benzyl bromide to the tertiary amine. The contents of these three patents are hereby incorporated by reference.

As is well known in the art, the reaction with benzyl chloride or benzyl bromide can be completed by adding a minor amount of methylene chloride to the reaction mixture so that a blend of products which are predominantly benzyl substituted is obtained. This blend may then be used without further separation of components to prepare the organophilic clay.

Illustrative of the numerous patents which describe organic cationic salts, their manner of preparation and their use in the preparation of organophilic clays are commonly assigned U.S. Pat. Nos. 2,966,506, 4,081,496, 4,105,578, 4,116,866, 4,208,218, 4,391,637, 4,410,364, 4,412,018, 4,434,075, 4,434,076, 4,450,095 and 4,517,112, the contents of which were incorporated by reference.

The organophilic clay gellant of the present invention may also be the reaction product of the smectite-type clay, an organic cation and an organic anion. The organic anion is selected from a wide range of materials which are capable of reacting with the organic cation in order to form an organic cation/organic anion complex which may be intercalated with the smectite-type clay. The molecular weight (gram molecular weight) of the organic anion is preferably 3,000 or less, and most preferably 1,000 or less and contains at least one acidic moiety per molecule so as to permit the formation of the organic cation/organic anion complex. The organic anion is preferably derived from an organic compound having a $pK_A$ less than about 11.0.

Preferable organic anions are derived from carboxylic acids, such as stearic acid, sulfonic acids and alkyl sulfates, such as the lauryl half ester of sulfuric acid, with an especially preferred anion being stearate particularly where the organophilic clay gellant is designed for thickening a polyester composition.

The organic anion, which includes mixtures of organic anions, is reacted with the organic cation and smectite-type clay to form the organophilic clay and may be added to the reaction mixture is acid or salt form. Exemplary of the latter form are alkali metal salts, alkaline earth salts, ammonium and organic amines.

Representative salts are those formed with hydrogen, lithium, sodium, potassium, magnesium, calcium, barium, ammonium and organic amines such as ethanolamine, diethanolamine, triethanolamine, methyldiethanolamine, butyldiethanolamine, diethylamine, dimethylamine, triethylamine, dibutylamine, and so forth, and mixtures thereof. The most preferred salt is formed with sodium.

The amount of organic anion reacted with smectite-type clay and the organic cation is sufficient to obtain a milliequivalent ratio of organic cation to organic anion in the range of from about 1.70:1.0 to about 28:1.0, preferably from about 3.0:1.0 to about 12:1.0. Of course the most preferred ranges depend on the particular organic cation and organic anion and the intended environment of use and can be determined by experimentation guided by the information set forth above. A most preferred range for organophilic clay gellants of the present invention designed for polyester compositions have an organic cation to organic anion ratio in the range of from about 4.0:1.0 to about 6.0:1.0. To illustrate the foregoing general principle, where the smectite-type clay is bentonite and the amount of organic cation is 102 milliequivalents, from about 5 to about 50 milliequivalents, preferably from about 10 to about 30 milliequivalents of anion, such as stearate, per 100 grams of clay, 100% active basis, is reacted.

Illustrative patents which describe suitable organic anions which may be co-reacted with the organic cation and the smectite-type clay in order to form the organophilic clay include commonly assigned U.S. Pat. Nos.

4,412,018, 4,434,075 and 4,517,112, the contents of all of which are incorporated by reference.

It has been found that with a given organic cation and, if present, a given organic anion (which of course includes mixtures of cations and/or anions as indicated previously), there are three process parameters which contribute to the improved results obtained by the organophilic clay gellant of the present invention. The three process parameters are: (1) shearing of the smectite-type clay prior to reaction with the organic cation and, if present, the organic anion; (2) using dilute reaction slurry conditions; and (3) gentle drying of the organophilic clay product. Although all three of these parameters contributes to the advantageous results, the importance of the individual parameter will vary according to the composition of the organophilic clay gellant. Thus, for example, the gentle drying conditions helps preserve and enhance the results obtained by shearing and/or dilution for certain organophilic clay gellants designed for polyester compositions. Therefore, in these instances, the organophilic clay gellant is preferably prepared by using shearing and/or dilution coupled with the gentle drying step. Of course, the most preferred organophilic clay gellant is prepared by using the combination of the three parameters.

To achieve shearing of the smectite-type clay, the clay is dispersed in water at a concentration of from about 0.5 to about 80% by weight. The slurry may optionally be first centrifuged to remove non-clay impurities which constitute about 10% to about 50% of the starting clay composition. Of course, if the clay has previously been treated, such as by the clay vendor, to remove the impurities, the treated clay can be formed into a slurry at a concentration of from about 0.5 to about 80% by weight, preferably from about 0.5 to about 3.0% by weight and directly subjected to shearing so as to separate the clay agglomerates. The shear conditions are selected such that sufficient separating of the clay agglomerates occurs as can be determined by the methylene blue spot test or particle size analysis.

The methylene blue spot test measures the cation exchange and adsorption capacity of the clay by reacting the clay with a methylene blue solution. A typical procedure is as follows:

1. Weigh 10 grams ($\pm 1$ mg) of a clay slurry of known solids content (usually about 3% by weight) into a 250 ml Ehrlenmeyer flask.
2. Add 50 ml distilled water and stir using a magnetic stirrer.
3. Add 2 ml 5N sulfuric acid and stir.
4. Add methylene blue solution (1 ml=0.01 milliequivalents) to the flask at a rate of 1 to 2 drops per second until 110 m.e./100 gms (calculated from clay weight used) has been added.
5. Wash down the flask with distilled water and continue to stir for about 10–15 minutes.
6. While the solids are suspended, remove one drop of liquid with the stirring rod and place the drop on filter paper (Whatman No. 1), labelling the drop with the burette reading in 0.1 mls.
7. There should be no greenish-blue halo surrounding the dyed solids.
8. Add increments of 0.2 to 0.5 ml of methylene blue solution stirring at least 5 minutes after each addition and washing down with distilled water after each addition. After 5 minutes stirring, run the drop test, recording for each test spot the burette reading.
9. When a faint green-blue halo surrounds the suspended solids of the spot test, stir an additional 10 minutes and repeat the spot test. If the halo persists the end point has been exceeded.
10. The methylene blue adsorption is expressed as milliequivalents of methylene blue per 100 grams of clay and is calculated as follows:

$$\text{clay capacity} = \frac{\text{mls. methylene blue} \times 100}{(\text{gms of slurry} \times \% \text{ solids})}$$

To minimize human error in the determination of the end point, some of the clay slurry may be filtered through coarse filter paper (e.g., Whatman 5H), the intensity of the filtrate compared with methylene blue blank solutions at 1668 or 609 mm on a colorimeter and correcting the degree of overrun or underrun of the end point.

Using the methylene blue spot test, sufficient shear should be imparted to the clay slurry so as to obtain an increase in the clay capacity of from about 10 to about 50%, preferably from about 15 to about 40% and most preferably from about 20 to about 35% when compared to the unsheared clay. Thus, for example, sufficient shearing may be imparted to a 3% bentonite slurry so as to increase the clay capacity as determined by the methylene blue spot test from about 115 milliequivalents per 100 grams of clay to about 135 milliequivalents per 100 grams of clay.

A further technique for determining that sufficient shear has been imparted to the clay slurry is to conduct a particle size analysis. That is, unsheared clay particles are analyzed, such as with a Nicomp Model 270 Submicron Particle Sizer available from Pacific Scientific Company which operates on a laser light scattering principle and the clay then sheared. The sheared clay has a reduction in median particle size of from about 10 to about 80%, preferably from about 20 to about 60% when compared to the unsheared clay particles. Thus, for example, an unsheared 3.0% bentonite clay slurry may exhibit an average median particle size of 0.64 microns. If this identical slurry is subjected to an increasing amount of shear which can be accomplished by passing the clay slurry through a Manton-Gaulin homogenizer at various pressures, then the following decreasing median particle sizes are observed: 0.5 microns (1,000 psi); 0.43 microns (2,000 psi); 0.42 microns (3,000 psi); 0.37 microns (4,000 psi); and 0.37 microns (5,000 psi). This same trend in decreasing median particle size of the clay solids with increasing shear can be observed when a 3.0% bentonite clay slurry is subjected to increasing shear times in a Waring Blendor operating at high speed for various lengths of time: 0.66 microns (0 minutes); 0.58 microns (2 minutes); 0.54 microns (4 minutes); 0.52 microns (6 minutes); 0.53 microns (8 minutes); and 0.52 microns (10 minutes).

Shear can be imparted to the smectite-type clay slurry by means of commercially available equipment that is known to impart high shear to the material. Illustrative of such equipment are a Manton-Gaulin homogenizer available from Manton-Gaulin Company, a Tekmar SD-45 Homogenizer available from Tekmar Company, a Sharples Super Centrifuge available from Sharples Division of Pennwalt Corporation, an Oakes mill available from Oakes Machinery, a Waring Blendor available from Waring Products, a Microfluidizer available from Microfluidics Corporation, a division of Biotechnology Corporation, and similar devices which can impart high laminar and turbulent shear to the clay slurry. Exemplary conditions using a Manton-Gaulin homogenizer are a pressure in the range from about 500 to about 8000 psi with one or more passes of the clay slurry through the homogenizer.

The second process parameter is a dilute reaction medium when the smectite-type clay and organic material are reacted. Dilution can be performed before or during clay shearing, but is more preferably performed after shearing has been conducted. Of course, dilution can be performed before, during and after shearing if so desired. The clay slurry is diluted so that the clay content is from about 0.5 to about 2.5% by weight, preferably from about 0.5% to about 2.0% by weight and most preferably from about 0.5 to about 1.5% by weight of the slurry. To the extent that dilution is performed after shearing, it can be achieved either by adding the required amount of water to the clay slurry prior to or during the addition of the organic cation and, if present, the organic anion or by adding the required amount of water to the clay slurry and one or both of the organic cation and organic anion or mixture thereof, or by adding water only to one or both of the organic cation, organic anion or mixture thereof which is then added to the clay slurry. The important result is that the reaction of the organic material with the clay occurs under dilute conditions. That is, the clay is within the aforementioned ranges when reacted with the organic cation and, if present, the organic anion (the amount of organic cation and organic anion is not included in the calculation of the clay content of the slurry). These dilute reaction conditions help increase the viscosity-build capabilities of the organphilic clay gellant over similar gellants prepared according to standard organophilic clay preparation procedures which do not use such dilute conditions.

Prior to reaction of the smectite-type clay slurry with the organic material, the slurry is agitated and heated to a temperature in the range 20° to 100° C., preferably 45° to 75° C. Any range of normal stirring speeds can be applied to the reaction slurry. If both organic cation and organic anion are used to prepare the organophilic clay gellant, the addition of the organic cation and organic anion may be done separately in either order or in combination. They may be added neat or dispersed in water or water mixed with a miscible organic solvent such as isopropyl alcohol. As indicated above, these latter two instances may be conducted in order to achieve dilute reaction conditions. The organic solvent is used with water to solublize the organic material, but has no effect on the performance of the final organophilic clay at lower concentrations. It has been observed, however, that an increase of isopropyl alcohol from 0.8% to 2.4% of the total reaction slurry gives a slight boost to the viscosity performance of the final gellant.

After the addition of the organic material, the reaction mixture is mixed with agitation at a temperature between 20° and 100° C., preferably 45° to 75° C., for a sufficient time to permit exchange of organic cation and, if organic anion is also present, to allow the formation of organic cation-organic anion complexes which are intercalated with the clay. Reaction temperatures below 20° C. or above 100° C. while usable, are not preferred because of the need for additional processing apparatus, namely cooling devices and pressure reactors.

The reacted product is then filtered and can be repulped with additional water to promote washing and then refiltered. Whereas washing the filtered product following the formation of the organophilic clay is highly desirable to remove salts such as sodium halides, it is not necessary when the product is prepared under dilute reaction conditions since the amount of salt remaining is only slightly detrimental to viscosity performance.

After the organophilic clay gellant is separated from the reaction mixture, it is dried. In the past, commercial organophilic clays have typically been dried in an airstream at elevated temperatures within the range of from about 120° to about 250° C. In accordance with the present invention, it has been found that more gentle drying conditions can lead to improved gellant performance. As indicated above, with some organophilic clay gellants, such as certain gellants to be used in polyester compositions, the gentle drying conditions are important to preserve and enhance the benefits obtained by shearing and/or dilution. With other organophilic clay gellants, such as certain gellants to be used in lubricating greases, the effect of the gentle drying is to yield an improvement in performance in addition to the improvement in performance obtained by the other parameters.

The gentle drying of the organophilic clay in accordance with this aspect of the present invention is conducted such that the wet organophilic clay should not exceed about 50° C. during drying. One manner of achieving this goal is to dry the organophilic clay gellant in an airstream at from about 25° to about 50° C., preferably from about 35° to about 45° C. until the moisture content is less than about 5%, preferably less than 2%. Alternatively, the organophilic clay gellant can be dried in a fluidized bed which is maintained at a temperature in the range of from about 25° to about 125° C., preferably from about 25° to about 100° C. Of course, when a fluidized bed is used, the temperature and air flow are selected such that the rapid evaporation of water keeps the organophilic clay gellant in the bed below about 50° C. until it is dried. As a still further alternative, the organophilic clay gellant may be freeze-dried at a temperature below about 0° C.

After the organophilic clay gellant is dried, it is typically ground using a hammer mill or similar grinding apparatus to break apart the agglomerates. The ground organophilic clay gellant generally has a particle size in the range of from about 0.1 to about 500 microns, preferably from about 1 to about 150 microns. Naturally, the desired size of the organophilic clay gellant particles is dictated by the environment of use.

The organophilic clay gellants of the present invention can be used to efficiently and effectively increase the viscosity of various organic compositions. Depending in large part on the composition, the organophilic clay gellant can be used in a conventional manner to thicken organic compositions exemplified by lubricating greases, oil base muds, oil base packer fluids, paint-varnish-lacquer removers, paints, cosmetic foundations, foundary molding, sand binders, adhesives, sealants, and inks. As can be understood, the organophilic clay gellant is selected such that it is effective in the particular organic composition. For example, bentonite or hectorite clay can be reacted with dimethyl dihydrogenated tallow ammonium cation to produce a gellant well suited for thickening lubricating greases. Other specific gellants may be ascertained from the above-identified commonly assigned U.S. patents which have been incorporated by reference and the Examples set forth later.

Certain organophilic clay gellants made in accordance with the present invention are particularly useful in thickening unsaturated polyester compositions based on unsaturated acids or acid anhydrides and diols in admixture with unsaturated aromatic monomers such as styrene. Upon curing, which is initiated by peroxides, the polyesters become cross-linked. The polyester compositions, when cross-linked, can be used to produce coatings or glass fiber-reinforced laminates by methods well known in the art. In the preparation of glass fiber-reinforced laminates of these cross-linked polymers, thixotropic gelling agents are employed which do not substantially affect the viscosity of the uncross-linked polyester at high shear such as is developed in mixing and spraying, but which increases their viscosity at low or no shear to prevent drainage of the composition along the vertical surfaces to which they are applied.

Unsaturated polyesters useful in preparing the thixotropic compositions are polyesters of a dicarboxylic acid and a diol having a major amount of olefinic unsaturation, preferably 10 to 75 olefin groups per ester groups. The olefinic unsaturation is preferably derived from the carboxylic acid although the diol may be unsaturated. Typical diols are ethylene glycol and propylene glycol. Typical unsaturated acids include maleic acid, fumaric acid as well as anhydrides of these acids. Such polyesters are made by conventional techniques of esterification as is well known in the art. Generally, polyesters having molecular weights of from about 400 to 10,000 and acid numbers in the range of from 35 to 45 mg KOH per gram of resin are useful for preparing thixotropic polyester comopositions. Additionally, dicyclopentadiene or isophthalic acid based polyester resins may also be used.

The unsaturated aromatic monomers are aromatic compounds to which is bonded one or more ethylenically unsaturated groups such as a vinyl group, substituted vinyl group or an allylic group. Suitable monomers include styrene, $\alpha$-methyl styrene, divinyl benzene, and allyl benzene. Styrene is preferred due to its effectiveness, wide use and availability. Such monomers are used in cross-linking the polyesters and also act as diluents to reduce viscosity.

In a typical procedure for preparing unsaturated polyester compositions, the liquid unsaturated polyester resin is mixed in a conventional apparatus with unsaturated aromatic monomer to prepare a solution having a solids content between about 40 and 95% by weight polyester. Additional descriptions of polyester compositions exist in U.S. Pat. Nos. 3,974,125, 4,216,135 and 4,240,951, the contents of which are incorported by reference.

The organophilic clay gellants of this invention can then be added to the liquid laminating resin and mixed in under low shear conditions to form a homogeneous mixture. That is, the gellant can be directly added to the polyester composition without the necessity of forming the pregel required in the past. The amounts of organophilic clay gellant used in polyester compositions can range from 0.25% to 10%, preferably 0.5% to 4%. Amounts larger than 10% may be employed even though such levels are not economical and may form a resin system that is difficult to handle.

Further evidencing the improved nature of the organophilic clay gellants of the present invention is the ability to achieve greater efficiency when a pregel is formed. In other words, although the organophilic clay gellant may be directly added to the polyester composition with acceptable results, forming a pregel by gentle mixing of the aromatic monomer with the gellant in order to wet the particles thereof permits a higher efficiency to be obtained. Although conventional pregelling techniques wherein high shear is required can be used, pregels formed with the organophilic clay gellant of the present invention under mild shear conditions can yield even higher efficiency when the pregel is mixed with the liquid unsaturated polyester. Thus, for example, in contrast to high shear conditions wherein a Cowles blade is employed, mild shear conditions can be obtained by using a Lightnin mixer with a 2 inch diameter, 3 blade propeller at 1200 rpm for 15 minutes for about 100 grams of pregel in a one quart can.

The following inventive and comparative examples are given to illustrate and contrast the present invention. However, the examples should not be construed as limiting the invention. Unless otherwise indicated, all percentages are given in weight percent of the total composition.

EXAMPLE 1

About 2.5 gallons of a 3.02% solids slurry of Wyoming bentonite in water which had been previously treated by centrifugation to remove non-clay impurities and ion-exchanged to provide the clay in the sodium form is passed through a Manton-Gaulin homogenizer at 5,000 psi pressure. 662.3 grams of this slurry is placed in a reaction vessel of a suitable size (3 liters) and diluted with 1003 ml of water. The slurry is heated to 65° C. with stirring. A solution of 11.38 grams of 80.3% active benzyl dimethyl hydrogenated tallow ammonium chloride (106 milliequivalents per 100 grams clay) and 1.38 grams sodium stearate (22.5 milliequivalents per 100 grams clay) dissolved in 300 ml $H_2O$ is poured into the clay slurry. (The amount of water added to the reaction slurry is equal to an amount which, when added to the clay slurry, will yield a clay content of 1.02%.) The mixture is stirred for 30 minutes at 65° C. and the solids are collected on a vacuum filter. The filter cake is washed with hot (55° C.) water and forced air dried at 40° C. for 16 hours to remove residual water from the organophilic clay gellant. The dried organophilic clay gellant is ground using a hammer mill to achieve an average particle size of about 35 microns.

EXAMPLE 2

The organophilic clay gellant of Example 1 is dispersed in a 56% solids/44% styrene unsaturated polyester resin prepared from an unsaturated polyester formulation comprising 68% resin solids (Reichhold 31-001, a commercial product from Reichhold Chemicals) and 32% styrene and let-down with styrene in an amount to provide a 1% concentration of the organophilic clay gellant in the fluid mixture. The dispersion is accomplished using a Cowles dispersator (2,000 linear feet per minute) for 15 minutes.

Viscosity data for the resin system are determined using a Brookfield LVT viscometer using a No. 3 spindle at 25° C. ($\pm 1$° C.) at 6 rpm after 3 minutes or 60 rpm after 30 seconds. The thixotropic index (T.I.) is a ratio of the viscosities taken at 6 and 60 rpm. Results are presented in Table I.

COMPARATIVE EXAMPLE A

For comparison purposes, the organophilic clay of Example 2 is replaced by a fine particle size fumed silica (Cab-O-Sil, a commercial product of Cabot Corporation) at 1% by weight levels in the polyester composition described in Example 2.

Viscosity data for the resin system are determined using a Brookfield LVT viscometer using a No. 3 spindle. Results are presented in Table I.

COMPARATIVE EXAMPLE B

For comparison purposes, the organophilic clay of Example 2 is replaced by an organophilic clay of similar composition prepared without shearing the clay slurry, dilute reaction conditions or gentle drying.

About 662.3 grams of 3.02% solids slurry of Wyoming bentonite in water which has been previously treated by centrifugation to remove non-clay impurities and ion-exchanged to provide the clay in the sodium form is placed in a reaction vessel of a suitable size (3 liters). The slurry is heated to 65° C. with stirring. A heated solution of 11.38 grams of 80.3% active benzyl dimethyl hydrogenated tallow ammonium chloride (106 milliequivalents per 100 grams clay) and 1.38 grams sodium stearate (22.5 milliequivalents per 100 grams clay) is prepared at 65° C. and poured into the clay slurry. The mixture is stirred for 30 minutes at 65° C. and the solids are collected on a vacuum filter. The filter cake is washed with hot (55° C.) water and forced air dried at 120° C. for 16 hours. The dried organophilic clay gellant is ground using a hammer mill to achieve an average particle size of about 35 microns.

The organophilic clay gellant of this Comparative Example is loaded at a 1% by weight level in the polyester composition described in Example 2. Viscosity data for the resin system are determined using a Brookfield LVT viscometer with a No. 3 spindle. Results are presented in Table I.

TABLE I

| Example | Brookfield LVT Viscosities (cps) | | Thixotropic Index |
|---|---|---|---|
| | 6 RPM | 60 RPM | |
| Example 2 | 2580 | 790 | 3.3 |
| Comparative Example A | 1680 | 532 | 3.2 |
| Comparative Example B | 200 | 200 | 1.0 |

Table I shows that a preferred composition made in accordance with the present invention imparts higher viscosity to the polyester composition, a higher thixotropic index, and a better rheology than the comparative examples.

EXAMPLE 3

About 2.5 gallons of 3.02% solids slurry of Wyoming bentonite in water which had been previously treated by centrifugation to remove non-clay impurities and ion-exchanged to provide the clay in the sodium form is passed through a Manton-Gaulin homogenizer at 5,000 psi pressure. 662.3 grams of this slurry is placed in a reaction vessel of a suitable size (3 liters). The slurry is heated to 65° C. with stirring. A solution of 11.38 grams of 80.3% active benzyl dimethyl hydrogenated tallow ammonium chloride (106 milliequivalents of 100 grams clay) and 1.38 grams sodium stearate (22.5 milliequivalents per 100 grams clay) dissolved in 76 ml $H_2O$ is poured into the clay slurry. (The amount of water added to the reaction slurry is equal to an amount which, when added to the clay slurry, will yield a clay content of 2.75%). The mixture is stirred for 30 minutes at 65° C. and the solids are collected on a vacuum filter. The filter cake is washed with hot (55° C.) water and forced air dried at 40° C. for 16 hours. The dried organophilic clay gellant is ground using a hammer mill to achieve an average particle size of about 35 microns.

The organophilic clay gellant of this Example is loaded at a 1% by weight level in the polyester composition described in Example 2. Viscosity data for the resin system are determined with a Brookfield LVT viscometer with a No. 3 spindle. Results are presented in Table II.

EXAMPLE 4

651.5 Grams of a 3.07% solids slurry of Wyoming bentonite in water which had been previously treated by centrifugation to remove non-clay impurities and ion-exchanged to provide the clay in the sodium form is placed in a reaction vessel of a suitable size (3 liters) and diluted with 1011 ml. of water. The slurry is heated to 65° C. with stirring. A solution of 11.38 grams of 80.3% active benzyl dimethyl hydrogenated tallow ammonium chloride (106 milliequivalents per 100 grams clay) and 1.38 grams of sodium stearate (22.5 milliequivalents per 100 grams clay) dissolved in 337 ml $H_2O$ is poured into the clay slurry. (The amount of water added to the reaction slurry is equal to an amount, which when added to the clay slurry, will yield a clay content of 1%). The mixture is stirred for 30 minutes at 65° C. and the solids are collected on a vacuum filter. The filter cake is washed with hot (55° C.) water and forced air dried at 40° C. for 16 hours. The dried organophilic clay gellant is ground using a hammer mill to obtain an average particle size of about 35 microns.

The organophilic clay gellant of this Example is loaded at a 1% by weight level in the polyester composition described in Example 2. Viscosity data for the resin system are determined using a Brookfield LVT viscometer with a No. 3 spindle. Results are presented in Table II.

COMPARATIVE EXAMPLE C 651.1 Grams of a 3.07% solids slurry of Wyoming bentonite in water which had been previously treated by centrifugation to remove non-clay impurities and ion-exchanged to provide the clay in the sodium form is placed in a reaction vessel of suitable size (3 liters). The slurry is heated to 65° C. with stirring. A solution of 11.38 grams of 80.3% active benzyl dimethyl hydrogenated tallow ammonium chloride (106 milliequivalents per 100 grams clay) and 1.38 grams sodium stearate (22.5 milliequivalents per 100 grams clay) dissolved in 76 ml of $H_2O$ is poured into the clay slurry. (The amount of water added to the reaction slurry is equal to an amount which, when added to the clay slurry, will yield a clay content of 2.75%). The mixture is stirred for 30 minutes at 65° C., and the solids are collected on a vacuum filter. The filter cake is washed with hot (55° C.) water and forced air dried at 40° C. for 16 hours. The dried organophilic clay gellant is ground using a hammer mill to obtain an average particle size of about 35 microns.

The organophilic clay gellant of this Example is loaded at a 1% by weight level in the polyester composition described in Example 2. Viscosity data for the resin system are determined using a Brookfield LVT viscometer with a No. 3 spindle. Results are presented in Table II.

TABLE II

| Example | Brookfield LVT Viscosities (cps) | | Thixotropic Index |
|---|---|---|---|
| | 6 RPM | 60 RPM | |
| Example 2 | 2580 | 790 | 3.3 |
| Example 3 | 500 | 308 | 1.6 |
| Example 4 | 1540 | 544 | 2.8 |
| Comparative Example A | 1680 | 532 | 3.2 |
| Comparative Example C | 460 | 296 | 1.6 |

The results of Table II show that organophilic clay prepared with dilute reactor conditions and/or sheared clay slurry, in conjunction with gentle drying, impart improved viscosity performance to the polyester compositions.

EXAMPLE 5

This Example shows the effect of substituting fluid bed drying for forced air drying at 40° C. on the polyester resin performance of the preferred composition of this invention. Samples of the preferred composition are prepared as in Example 1 except that instead of forced air drying the solids at 40° C. for 16 hours, drying is done with a fluid bed dryer under conditions described in Table III. A fluid bed dryer from PRL Engineering, Ltd., Model FBD/L72, is used to dry 150 grams of wet filter cake containing 10% by weight of organophilic clay. The air flow rate for this instrument is setting #2.

The organophilic clay gellants of this Example are loaded at a 1% weight level in the polyester composition described in Example 2. Viscosity date for the resin system are determined using a Brookfield LVT viscometer using a No. 3 spindle. Results are presented in Table III.

TABLE III

| Example No. | Drying Air Temp. | Drying Time | Brookfield LVT Viscosities (cps) | | Thixotropic Index |
|---|---|---|---|---|---|
| | | | 6 RPM | 60 RPM | |
| Example 1 | 40° C. | 16 hr | 2220 | 712 | 3.1 |
| Example 5A | 25° C. | 100 min | 2720 | 790 | 3.4 |
| 5B | 80° C. | 20 min | 2380 | 720 | 3.3 |
| 5C | 100° C. | 16 min | 2120 | 666 | 3.2 |
| 5D | 120° C. | 13 min | 1660 | 580 | 2.9 |

EXAMPLE 6

About 2.5 gallons of a 2.94% solids slurry of Wyoming bentonite in water which had been previously treated by centrifugation to remove non-clay impurities and ion-exchanged to provide the clay in the sodium form is passed through a Manton-Gaulin homogenizer at 5,000 psi pressure. 680.3 grams of this slurry is placed in a reaction vessel of suitable size (3 liters) and diluted with 1 liter of water. The slurry is heated to 65° C. with stirring. A solution of 11.19 grams of 81% active benzyl dimethyl hydrogenated tallow ammonium chloride (106 milliequivalents per 100 grams clay) and 1.22 grams sodium stearate (20 milliequivalents per 100 grams clay) dissolved in 350 ml $H_2O$ is poured into the clay slurry. The mixture is stirred for 30 minutes at 65° C. and the solids are collected on a vacuum filter. The filter cake is washed with hot (55° C.) water and separated into seven equal portions. Six of the portions are dried at different forced air temperatures: 40° C., 65° C., 79° C., 93° C., 107° C., and 121° C. for 16 hours, and a final portion is freeze-dried at 0° C. The dried organophilic clay gellants are ground using a hammer mill to obtain an average particle size of about 35 microns.

The organophilic clay gellants of this Example are dispersed in a 56% solids/44% styrene unsaturated polyester resin prepared from an unsaturated polyester formulation comprising resin solids (Reichhold 31001, a commercial product from Reichhold Chemicals) and 32% styrene and let-down with styrene in an amount to provide a 1% concentration of the organophilic clay in the final mixture. The dispersion is accomplished with the use of a Cowles dispersator at low shear (2,000 linear feet per minute) for 15 minutes.

Viscosity data for the resin systems is determined using a Brookfield LVT viscometer with a No. 3 spindle. The results are presented in Table IV.

TABLE IV

| Example No. | Forced Air Temperature | Brookfield LVT Viscosities (cps) | | Thixotropic Index |
|---|---|---|---|---|
| | | 6 RPM | 60 RPM | |
| 6A | 40° C. | 1940 | 648 | 3.0 |
| 6B | 65° C. | 1340 | 510 | 2.6 |
| 6C | 79° C. | 920 | 412 | 2.2 |
| 6D | 93° C. | 380 | 292 | 1.3 |
| 6E | 107° C. | 380 | 270 | 1.4 |
| 6F | 121° C. | 200 | 200 | 1.0 |
| 6G | 0°-freeze dried | 2520 | 776 | 3.2 |

Table IV shows that as the forced air drying temperature of the organophilic clay gellants of the invention increases, the rheological performance of the organoclay in the polyester composition decreases.

EXAMPLE 7

The organophilic clay gellant of Example 1 is dispersed in a 62% resin solids/38% styrene unsaturated polyester resin prepared from an unsaturated polyester formulation comprising 68% of a dicyclopentadiene based resin (TS-2000, a commercial product available from Owens Corning Corporation)/32% styrene and let-down with styrene in an amount to provide a 1% concentration of the organophilic clay in the final mixture. The dispersion is accomplished using a Cowles dispersator at low shear (2,000 linear feet per minute) for 15 minutes.

Viscosity data for the resin system are determined using a Brookfield LVT viscometer with a No. 3 spindle. The results are presented in Table V.

COMPARATIVE EXAMPLE D

For comparison purposes, the organophilic clay of Example 8 is replaced by a fine particle size fumed silica (Cab-O-Sil, a commercial product from Cabot Corporation) at 1% by weight levels in the polyester composition described in Example 8.

Viscosity data for the resin system are determined using a Brookfield LVT viscometer with a No. 3 spindle. Results are presented in Table V.

TABLE V

| Example | Brookfield LVT Viscosities (cps) | | Thixotropic Index |
|---|---|---|---|
| | 6 RPM | 60 RPM | |
| Example 7 | 2260 | 860 | 2.6 |
| Comparative | 580 | 490 | 1.2 |

TABLE V-continued

| Example | Brookfield LVT Viscosities (cps) 6 RPM | 60 RPM | Thixotropic Index |
|---|---|---|---|
| Example D | | | |

Table V shows that a preferred composition made in accordance with the present invention imparts high viscosity to the polyester resin composition, a higher thixotropic index and a better rheology than the comparative example.

EXAMPLE 8

6.0 grams of the organophilic clay gellant of Example 1 is added to 108.18 grams of monomeric styrene in a mixing container and stirred for 12 minutes using a lab mixer fitted with a 2 inch diameter 3 bladed propeller turning at a rate of 785 linear feet per minute. The high solids Reichlold 31-001 polyester resin in a quantity of 485.82 grams is then added to the mix along with 1.2 grams of 12% cobalt octoate and stirring is continued for an additional 5 minutes. Viscosity data for the resin system are determined using a Brookfield LVT viscometer using a No. 3 spindle and are presented in Table VI.

COMPARATIVE EXAMPLE E

For comparison purposes, the organophilic clay of Example 8 is replaced by fine particle size fumed silica (Cab-O-Sil, a commercial product from Cabot Corporation) at the same concentration level and mixing times. Viscosity data for the resin system are determined using a Brookfield LVT viscometer using a No. 3 spindle. Results are presented in Table VI.

TABLE VI

| Example | Brookfield LVT Viscosities (cps) 6 RPM | 60 RPM | Thixotropic Index |
|---|---|---|---|
| Example 8 | 4140 | 1150 | 3.6 |
| Comparative Example E | 1960 | 633 | 3.1 |

Table VI shows that the preferred composition, when pregelled and made in accordance with the present invention, imparts high viscosity to the polyester resin composition, a higher thixotropic index and a better rheology than the comparative example.

EXAMPLE 9

About 2.5 gallons of a 2.83% solids slurry of Wyoming bentonite in water which has been previously treated by centrifugation to remove all non-clay impurities and ion-exchanged to provide the clay in the sodium form is passed through a Manton-Gaulin homogenizer at 5000 psi pressure. 714.28 grams of this slurry is placed in a reaction vessel of a suitable size (3 liters) and diluted with 979 mls of water. The slurry is heated to 65° C. with stirring. A solution of 11.38 grams of 80.3% active benzyl dimethyl hydrogenated tallow ammonium chloride (106 milliequivalents per 100 grams of solids) and 1.38 grams sodium stearate (22.5 milliequivalents per 100 grams of solids) dissolved in 327 mls of H$_2$O is added to the slurry. (The amount of water added to the reaction slurry is equal to an amount which, when added to the clay slurry, will yield a solids content of 1.01%).

During addition of the organic cation and the organic anion, the slurry is treated with a Tekmar homogenizer operating at 10,000 RPM for 10 minutes. The mixture is stirred for a total of 30 minutes at 65° C. and the solids are collected on a vacuum filter. The filter cake is washed with 1500 ml of hot (45° C.) water and drying is accomplished with a fluid bed dryer from PRL Engineering, Ltd., Model FBD/L72 with inlet air at room temperature and 4 hours drying time.

EXAMPLE 10

The organophilic clay gellant prepared in Example 9 is hammer milled with a 0.08 mm screen. 2.5 grams of the organophilic clay gellant of this example is slowly added to 450 grams of epoxy topcoat paint that is stirred with a Lightnin Mixer, Model V-7 at 1200 RPM and allowed to mix for 30 minutes. A small aliquot is withdrawn and a Fineness of Grind (F.O.G.) measured as per ASTM D1210-78. The remaining portion of paint is sealed and allowed to rest undisturbed overnight, after which a 10 RPM viscosity value is recorded on a Brookfield RVT Model viscometer equipped with a No. 2 spindle. The rheological properties of the gellant are shown in Table VII.

COMPARATIVE EXAMPLE F

Same procedure as Example 10 is used except 2.5 grams of BENTONE 27 (a commercial organophilic clay product of NL Industries) is substituted for the experimental product. The viscosity measurement is determined in the same manner as in the Example 10 and the results are set forth in Table VII.

TABLE VII

| Example | Brookfield LVT (10 RPM) | F.O.G. |
|---|---|---|
| Example 10 | 3750 | 5.5B |
| Comparative Example F | 250 | 0 |

Examples 11-14 demonstrate the use of the organophilic clay gellants of the present invention in thixotropic grease compositions.

EXAMPLE 11

About 50 gallons of a 2.88% solids slurry of Wyoming bentonite in water which had been previously treated by centrifugation to remove non-clay impurities and ion-exchanged to provide the clay in the sodium form is passed through a Manton-Gaulin homogenizer at 8,000 psi pressure. 5903 grams of this slurry is placed in a reaction vessel of a suitable size (20 liters) and diluted with 10,647 ml of water. The slurry is heated to 60° C. with stirring. A solution of 109.0 grams of 87.1% active dimethyl bishydrogenated tallow ammonium chloride (95 milliequivalents per 100 grams clay) dissolved in 250 ml isopropyl alcohol/450 ml H$_2$O heated to 60° C. is poured into the clay slurry. (The amount of water added to the reaction slurry is equal to an amount which, when added to the clay slurry, will yield a clay solids content of 1.0%). The mixture is stirred for 30 minutes at 60° C. and the solids are collected on a vacuum filter. The filter cake is washed with hot (60° C.) water and forced air dried at 40° C. for 16 hours to remove residual water from the organophilic clay gellant. The dried organophilic clay gellant is ground using a hammer mill fitted with a 0.5 mm screen to achieve an average particle size of about 0 microns.

The organophilic clay gellant is dispersed in a grease pregel prepared by mixing the organophilic clay gellant at a 7% by weight concentration and Conoco 5735 oil (a commercial product available from Continental Oil Company) with a drill press stirrer at 450 rpm for 5 minutes. Acetone at a 2% by weight concentration is added to the mixture and the mixture is mixed on the drill press stirrer at 450 rpm for an additional 25 minutes to form a pregel. Depth of penetration measurements are measured on the pregel at room temperature according to ASTM Method D217-82 entitled "Standard Test Method for Cone Penetration of Lubricating Grease". Penetration measurements are made with a grease penetrometer available from GCA/Precision Scientific Company wherein lower penetration values indicate a grease with harder consistency (higher viscosity). After the penetration measurement is recorded the grease pregel is passed through a rotor-stator type Tri-homo mill available from Sonic Corporation with a rotor-to-stator gap of 0.003 inch and a pump speed of 230 g/min. The grease is cooled to room temperature and a depth of penetration measurement is made. To determine consistencies of worked greases, the grease is placed in a grease worker available from Keohler Instrument Company and depth of penetrations are measured after 60 and 10,000 strokes in the grease worker.

Depth of penetration data are presented in Table VIII.

EXAMPLE 12

4234.5 Grams of a 3.07% solids slurry of Wyoming bentonite in water which had been previously treated by centrifugation to remove non-clay impurities and ion-exchanged to provide the clay in sodium form is placed in a reaction vessel of a suitable size (8 liters) and diluted with 705 ml of water. The slurry is heated to 60° C. with stirring. A solution of 84.35 grams of 84.8% active dimethyl bishydrogenated tallow ammonium chloride (95 milliequivalents per 100 grams clay) dissolved in 145 ml isopropyl alcohol and 260 ml $H_2O$ heated to 60° C. is poured into the clay slurry. (The amount of water added to the reaction slurry is equal to an amount which, when added to the clay slurry, will yield a clay content of 2.5%). The mixture is stirred for 30 minutes at 60° C. and the solids are collected on a vacuum filter. The filter cake is washed with hot (60° C.) water and forced air dried at 40° C. for 16 hours to remove residual water from the organophilic clay gellant. The dried organophilic clay gellant is ground using a hammer mill with a 0.5 mm screen to achieve an average particle size of about 10 microns.

The organophilic clay gellant of this Example is loaded at a 7% by weight level in the grease composition described in Example 11. Depth of penetration data are presented in Table VIII.

EXAMPLE 13

About 50 gallons of a 3.03% solids slurry of Wyoming bentonite in water which has been previously treated by centrifugation to remove non-clay impurities and ion-exchanged to provide the clay in the sodium form is passed through a Manton-Gaulin homogenizer at 5,000 psi pressure. 4290.4 grams of this slurry is placed in a reaction vessel of a suitable size (8 liters) and diluted with 650 ml of water. The slurry is heated to 60° C. with stirring. A solution of 84.35 grams of 84.8% active dimethyl bishydrogenated tallow ammonium chloride (95 milliequivalents per 100 grams clay) dissolved in 145 ml isopropyl alcohol/260 ml $H_2O$ heated to 60° C. is poured into the clay slurry. (The amount of water added to the reaction slurry is equal to an amount which, when added to the clay slurry, will yield a clay content of 2.5%.) The mixture is stirred for 30 minutes at 60° C. and the solids are collected on a vacuum filter. The filter cake is washed with hot (60° C.) water and forced air dried at 40° C. for 16 hours to remove residual water from the organophilic clay gellant. The dried organophilic clay gellant is ground using a hammer mill fitted with a 0.5 mm screen to achieve an average particle size of about 10 microns.

The organophilic clay gellant of this Example is loaded at a 7% by weight level in the grease composition described in Example 11. Depth of penetration data are presented in Table VIII.

COMPARATIVE EXAMPLE G

For comparison purposes, the organophilic clay gellant of Example 11 is replaced by a commercial organophilic organoclay BENTONE 34 R/A, a commercial product of NL Industries, at 7% by weight levels in the grease composition described in Example 11.

Depth of penetration data are presented in Table VIII.

TABLE VIII

| | Depth of Penetration (mm × 0.1) | | | |
|---|---|---|---|---|
| | | Worked Grease | | |
| Example | Pregel | 0 | 60 | 10,000 (Strokes) |
| Example 11 | 253 | 194 | 211 | 196 |
| Example 12 | 347 | 243 | 268 | 328 |
| Example 13 | 265 | 204 | 230 | 250 |
| Comparative Example G | 606 | 240 | 268 | 258 |

Table VIII shows that the organophilic clay gellants of the present invention display harder pregel and unworked grease consistencies than the comparison Example. The composition, Example 11, which was prepared with sheared clay, dilute reaction conditions, and gentle drying displays better mechanical stability (i.e., the absolute difference in penetration measurements between 0 and 10,000 strokes) than the comparative Example.

EXAMPLE 14

About 50 gallons of a 2.88% solids slurry of Wyoming bentonite in water which has been previously treated by centrifugation to remove non-clay impurities and ion-exchanged to provide the clay in the sodium form is passed through a Manton-Gaulin homogenizer at 8,000 psi pressure. 5903 grams of this slurry is placed in a reaction vessel of a suitable size (20 liters) and diluted with 447 ml of water. The slurry is heated to 60° C. with stirring. A solution of 109.0 grams of 87.1% active dimethyl bishydrogenated tallow ammonium chloride (95 milliequivalents per 100 grams clay) dissolved in 250 ml isopropyl alcohol/450 ml $H_2O$ heated to 60° C. is poured into the clay slurry. (The amount of water added to the reaction slurry is equal to an amount which, when added to the clay slurry, will yield a clay content of 2.5%). The mixture is stirred for 30 minutes at 60° C. and the solids are collected on a vacuum filter. The filter cake is washed with hot (60° C.) water and divided into 3 equal portions by weight which are forced air dried at 40° C., 80° C., and 130° C. for 16 hours to remove residual water from the organophilic clay gellant. The dried organophilic clay gellants are ground using a hammer mill fitted with a 0.5 mm screen to achieve an average particle size of about 10 microns.

The organophilic clay gellants of this Example are loaded at a 7% by weight level in the grease composition described in Example 11. Depth of penetration data are presented in Table IX.

TABLE IX

| Example | Drying Temperature (°C.) | Depth of Penetration (mm × 0.1) | | | |
|---|---|---|---|---|---|
| | | Pregel | Worked Grease | | |
| | | | 0 | 60 | 10,000 (Strokes) |
| Example 14A | 40 | 273 | 207 | 215 | 194 |
| Example 14B | 80 | 423 | 194 | 220 | 203 |
| Example 14C | 130 | 568 | 210 | 238 | 219 |

Table IX shows that drying temperature of an organophilic clay prepared with sheared clay slurry have minimal effect on the consistency of milled greases when the organophilic clay gellants of the present invention are incorporated into grease compositions. It must be noted, however, that pregel consistencies are much softer at higher drying temperatures.

EXAMPLE 15

About 2.5 gallons of a 3.02% solids slurry of Wyoming bentonite in water which has been previously treated by centrifugation to remove non-clay impurities and ion-exchanged to provide the clay in the sodium form is passed through a Manton-Gaulin homogenizer at 5,000 psi pressure. 2152.3 grams of this slurry is placed in a reaction vessel of a suitable size (8 liters) and diluted with 4347 ml of water. (The amount of water added to the clay slurry is equal to an amount which will yield a clay content of 1.0%). The slurry is heated at 65° C. with stirring. 43.23 grams of 84.5% active dimethyl bishydrogenated tallow ammonium chloride (95 milliequivalents per 100 grams clay) is melted at 65° C. and is poured into the clay slurry. The mixture is stirred for 30 minutes at 65° C. and the solids are collected on a vacuum filter. The filter cake is added to 1.5 liters of water and stirred for 30 minutes at 45° C. The washed solids are collected on a vacuum filter. The solids are forced air dried at 40° C. for 16 hours to remove residual water from the organophilic clay gellant. The dried organophilic clay gellant is ground using a hammer mill fitted with a 0.5 mm screen to achieve an average particle size of about 10 microns.

EXAMPLE 16

About 2.5 gallons of a 3.02% solids slurry of Wyoming bentonite in water which has been previously treated by centrifugation to remove non-clay impurities and ion-exchanged to provide the clay in the sodium form is passed through a Manton-Gaulin mixer at 5,000 psi pressure. 2152.3 grams of this slurry is placed in a reaction vessel of a suitable size (8 liters). The slurry is heated at 65° C. with stirring. 43.23 grams of 84.5% active dimethyl bishydrogenated tallow ammonium chloride (95 milliequivalents per 100 grams clay) is melted at 65° C. and is poured into the clay slurry. The mixture is stirred for 30 minutes at 65° C. and the solids are collected on a vacuum filter. The filter cake is added to 1.5 liters of water and stirred for 30 minutes at 45° C. The washed solids are collected on a vacuum filter. The solids are forced air dried at 40° C. for 16 hours to remove residual water from the organophilic clay gellant. The dried organophilic clay gellant is ground using a hammer mill fitted with a 0.5 mm screen to achieve an average particle size of about 10 microns.

COMPARATIVE EXAMPLE H

For comparison purposes, the organophilic clay of this comparative Example is the same composition as that prepared according to Example 15 but with an unsheared clay slurry, non-dilute reaction conditions and drying at 120° C.

2152.3 Grams of a 3.02% solids slurry of Wyoming bentonite in water which has been previously treated by centrifugation to remove non-clay impurities and ion-exchanged to provide the clay in the sodium form is placed in a reaction vessel of suitable size (8 liters). The slurry is heated to 65° C. with stirring. 42.23 l grams of 84.5% active dimethyl bishydrogenated tallow ammonium chloride (95 milliequivalents per 100 grams clay) is melted at 65° C. and is poured into the clay slurry. The mixture is stirred for 30 minutes at 65° C. and the solids are collected on a vacuum filter. The filter cake is added to 1.5 liters of water and stirred for 30 minutes at 45° C. The washed solids are collected on a vacuum filter. The solids are forced air dried at 120° C. for 16 hours to remove residual water from the organophilic clay gellant. The dried organophilic clay gellant is ground using a hammer mill fitted with a 0.5 mm screen to achieve an average particle size of about 10 microns.

EXAMPLE 17

This Example demonstrates the excellent dispersion and viscosity-build properties when a preferred organophilic clay is used in a red ink formulation. A base red ink is prepared according to Formulation 1.

| Formulation 1 Heatset Red Base | | | |
|---|---|---|---|
| Ingredient | Generic Name | Manufacturer | Formulation % by Weight |
| Lo-Cal A-7-T | Low Energy Heatset Varnish | Lauter Chemicals | 54.18 |
| Dyall C-219 at 45% by wt in Magiesol 47 | 45% High Melting Point Microwax Dispersion in Deodorized Ink Oil | Lauter Chemicals Magie Brothers | 6.40 |
| Dyall C-188 at 40% by wt in Magiesol 47 | 40% dispersion of Fisher-Tropsch Wax in Deodorized Ink Oil | Lauter Chemicals Magie Brothers | 4.25 |
| BASF 66-PP-0229 Predispersed Red Paste | Lithol Rubine in Heatset Vehicle | BASF | 33.00 |
| 15% Shell Ionol CP in Magiesol 47 | Antiskin Compound | Shell Company Magie Brothers | 2.17 |

A red ink is prepared according to Formulation 2. 100 Grams of base red ink in weighed into a pint can and mixed for 1 minute on a Dispermat CV (a Cowless Dispersator) at 3,000 rpm. After one minute the organophilic clay gellant prepared according to Example 15 is slowly added to the vortex of the ink. After the addition of the gellant to the ink formulation, the ink is dispersed at high speed at 3,000 rpm for 15 minutes. NPIRI (National Printing Ink Research Institute) grind values are measured at 5 and 10 minutes to evaluate dispersion. At 5 minutes, 0.7 parts 95% methanol/5% water is added to the ink. At 10 minutes, Magiesol 47 solvent is added to adjust ink tack. After 15 minutes of dispersion, the ink is passed through a 3 roller mill at 300 psi and NPIRI grind value measured.

| Formulation 2 Heatset Red Ink Formula | | |
|---|---|---|
| Ingredient | Source | Parts by Weight |
| Heatset Red Base | Formulation 1 | 100.0 |
| Organophilic Clay Gellant | Example 15 | 2.2 |
| 95% Methanol/5% Water | | 0.7 |
| Magiesol 47 | Magie Brothers | 12.5 |
| | | 115.4 |

Dispersion ratings are presented in Table X. The ink is rated for overall scratches and background haze. A dispersion rating of medium heavy indicates poor dispersion resulting in many scratches and a medium to heavy background haze. A rating of light indicates better dispersion properties although some background haze is evident. A rating of clean indicates good dispersion properties with the absence of large agglomerates or aggregates.

Viscosities are measured using the Thwing Albert falling rod viscometer at 25° C. according to ASTM Method D4040-81 entitled "Viscosity of Printing Inks and Vehicles by the Falling Rod Viscometer". Dispersion measurements, viscosities and yield values are presented in Table X. A yield value is the force required to induce flow.

EXAMPLE 18

The organophilic clay gellant of Example 17 is replaced by an organophilic clay gellant prepared in accordance with Example 16 at an equal weight loading in the heatset red ink formulation described in Example 17.

Dispersion and viscosity data for the ink formulation are presented in Table X.

COMPARATIVE EXAMPLE I

For comparison purposes, the organophilic clay gellant of Example 17 is replaced by an organophilic clay gellant prepared in accordance with Comparative Example H at an equal weight loading in the heatset red ink formulation described in Example 17.

Dispersion and viscosity data for the ink formulation are presented in Table X.

TABLE X

| | Dispersion at 3000 rpm | | | Viscosity | Yield Value |
|---|---|---|---|---|---|
| Example | 5 Min | 10 Min | 1 Pass (3-Roller Mill) | (poise) | (d/cm$^2$) |
| Example 17 | Light | Very Light | Clean | 59.0 | 940 |
| Example 18 | Medium | Light | Very Light | 58.1 | 780 |
| Comparative Example I | Medium Heavy | Light Medium | Very Light | 57.0 | 730 |

Table X shows that the compositions made in accordance with the present invention impart a higher yield value to the red ink formulation and better dispersion properties than the comparative example.

EXAMPLE 19

Three alkyd semi-gloss enamel paint formulations are prepared. Formulation 3 is prepared using the ingredients identified in Table XI which are mixed as indicated in the order in which they appear. The organophilic clay gellant used in this formulation is prepared in accordance with Example 15.

Formulation 4 is prepared in the same manner as Formulation 3 except the organophilic clay gellant used in this formulation is prepared in accordance with Example 16.

Formulation 5 is prepared in the same manner as Formulation 3 except that the organophilic clay gellant used in this formulation is prepared in accordance with Comparative Example H.

Each formulation was equilibrated for 24 hours at 25° C. after preparation and then measured for viscosity using a RVT Brookfield viscometer equipped with a No. 2 spindle at a spindle speed of 10 rpm. Fineness of grind (a measurement of dispersion) was determined according to ASTM Method D1210-79 entitled "Fineness of Dispersion of Pigment-Vehicle Systems".

Viscosity and fineness of grind data for the semi-gloss enamel paint formulation are presented in Table XII.

TABLE XI

| ALKYD SEMI-GLOSS ENAMEL | | | | | |
|---|---|---|---|---|---|
| | | | Formulation | | |
| Ingredient | Generic Name | Manufacturer | 3 Pounds | 4 Pounds | 5 Pounds |
| Aroplaz 1266M-70 | Alkyd Resin | Spencer Kellogg | 60.0 | 60.0 | 60.0 |
| AMSCO 663 | Mineral Spirits | AMSCO | 60.0 | 60.0 | 60.0 |
| | Mix at Low Speed Then Add: | | | | |
| Titanox 2101 | Titanium Dioxide | NL Industries, Inc. | 285.0 | 285.0 | 285.0 |
| Gama Sperse 80 | CaCO$_3$ | Georgia Marble | 155.0 | 155.0 | 155.0 |
| Example 15 | Organophilic Clay Gellant | | 6.0 | | |
| Example 16 | Organophilic Clay Gellant | | | 6.0 | |
| Comparative Example H | Organophilic Clay Gellant | | | | 6.0 |
| | Disperse at 5400 RPM for 15 Minutes, Then Add: | | | | |
| Aroplaz 1266-70 | Alkyd Resin | Spencer Kellogg | 414.1 | 414.1 | 414.1 |

TABLE XI-continued

ALKYD SEMI-GLOSS ENAMEL

| Ingredient | Generic Name | Manufacturer | Formulation 3 Pounds | Formulation 4 Pounds | Formulation 5 Pounds |
| --- | --- | --- | --- | --- | --- |
| AMSCO 663 | Mineral Spirits | AMSCO | 92.8 | 92.8 | 92.8 |
| 6% Co Drier | Cobalt Naphthenate | Nuodex | 2.3 | 2.3 | 2.3 |
| 6% Zr Drier | Zirconium Naphthenate | Nuodex | 6.1 | 6.1 | 6.1 |
| Exkin #2 | Methyl Ethyl Ketoxime | Nuodex | 1.5 | 1.5 | 1.5 |
| | | | 1082.8 | 1082.8 | 1082.8 |

TABLE XII

| Paint Property | Formulation Numbers 3 | 4 | 5 |
| --- | --- | --- | --- |
| Viscosity (cP) | 1760 | 1720 | 996 |
| Fineness of Grind | 7.0 | 7.0 | 6.5 |

Table XII shows that alkyd enamel paint formulations prepared with the organophilic clay gellants of the present invention result in higher viscosity values and higher fineness of grind measurements than the comparative example.

EXAMPLE 20

643.1 Grams of a 3.11% solids slurry of hectorite clay in water which has been previously treated by centrifugation to remove non-clay impurities is placed in a reaction vessel of a suitable size (3 liters) and diluted with 1357 ml of water. The slurry is heated at 65° with stirring. 13.11 grams of 84.5% active dimethyl bishydrogenated tallow ammonium chloride (95 milliequivalents per 100 grams clay) is melted at 65° C. and is poured into the clay slurry. The mixture is stirred for 30 minutes at 65° C. and the solids are collected on a vacuum filter. The filter cake is added to 1.5 liters of water and stirred for 30 minutes at 45° C. The washed solids are collected on a vacuum filter. The solids are forced air dried at 40° C. for 16 hours to remove residual water from the organophilic clay gellant. The dried organophilic clay gellant. The dried organophilic clay gellant is ground using a hammer mill fitted with a 0.5 mm screen to achieve an average particle size of about 10 microns.

COMPARATIVE EXAMPLE J

For comparison purposes, the organophilic clay gellant of this comparative example is the same composition as that prepared according to Example 20, but prepared with unsheared hectorite clay slurry, non-dilute reaction conditions and drying at 120° C.

643.1 Grams of a 3.11% solids slurry of hectorite clay in water which has been previously treated by centrifugation to remove non-clay impurities is placed in a reaction vessel of a suitable size (3 liters). The slurry is heated at 65° C. with stirring. 13.11 grams of 84.5% active dimethyl dishydrogenated tallow ammonium chloride (95 milliequivalents per 100 grams clay) is melted at 65° C. and is poured into the clay slurry. The mixture is stirred for 30 minutes at 65° C. and the solids are collected on a vacuum filter. The filter cake is added to 1.5 liters of water and stirred for 30 minutes at 45° C. The washed solids are collected on a vacuum filter. The solids are forced air dried at 120° C. for 16 hours to remove residual water from the organophilic clay gellant. The dried organophilic clay gellant is ground using a hammer mill fitted with a 0.5 mm screen to achieve an average particle size of about 10 microns.

EXAMPLE 21

Two alkyd semi-gloss enamal paint formulations are prepared. Formulation 6 is prepared using the ingredients identified in Table XI which are mixed as indicated in the order in which they appear. The organophilic clay gellant used in this formulation is prepared in accordance with Example 20.

Formulation 7 is prepared in the same manner as Formulation 3 except that the organophilic clay gellant used in this formulation is prepared in accordance with Comparative Example J.

Each formulation is equilibrated for 24 hours at 25° C. after preparation and then measured for viscosity using a RVT Brookfield viscometer equipped with a No. 2 spindle at a spindle speed of 10 rpm. Fineness of grind (a measurement of dispersion) is determined according to ASTM Method D1210-79 entitled "Fineness of Dispersion of Pigment-Vehicle Systems".

Viscosity and fineness of grind data for the semi-gloss enamel paint formulations are presented in Table XIII.

TABLE XIII

| Paint Property | Formulation Numbers 6 | 7 |
| --- | --- | --- |
| Viscosity (cP) | 1500 | 1240 |
| Fineness of Grind | 6.5 | 6.5 |

Table XIII shows that alkyd enamel paint formulations prepared with the organophilic clay gellant of the present invention result in higher viscosity value and similar fineness of grind measurement compared to the comparative example.

EXAMPLE 22

The organophilic clay gellent of Example 20 is evaluated in an oil mud formulation. 200 ml of Conoco LVT oil (a commercial product available from Continental Oil Company) is added to a Multimixer cup with 9.0 grams Invermal (a primary emulsifier, a commercial product available from NL Industries, Inc.), 2.0 grams EZ Mul NT (a secondary emulsifier, a commercial product available from NL Industries, Inc.), 5.0 grams hydrated lime, and 8.0 grams Duratowe HT (a fluid loss additive, a commercial product available from NL Industries, Inc.). These ingredients are mixed together 5 minutes at 11,500 rpm on a Multimixer available from Sterling Multi-Products. 41 ml of deionized water is added and the composite is mixed for an additional 5 minutes. 8.55 Grams of the organophilic clay gellant of Example 20 is sifted into the cup while mixing and mixing is continued for 10 minutes. 325 Grams of BaSO₄ (Sp. Gravity 4.2) is added to the composite and mixed for 5 minutes, 37.5 grams of CaCl₂.2H₂O is added to the composite and mixed 5 minutes. The sample is transferred to a pint jar, capped and placed in a 120° F. waterbath where the sample is allowed to equilibrate for one hour before testing. Rheological properties are tested at 120° F. after initial mixing and again after hot rolling 16 hours at 150° F. Viscosity measurements are made using a Fann Model 35 VG Meter (available from Fann Instrument Corporation). Results on Plastic Viscosity (cP), Yield Point (lb/100 sq ft), and gel strengths at 10 seconds and 10 minutes (lb/100 sq ft) are reported in Table XIV.

COMPARATIVE EXAMPLE K

For comparison purposes, the organophilic clay gellant of Example 22 is replaced by an organophilic clay gellant prepared in accordance with Comparative Example J in the drilling mud composition described in Example 22. Plastic viscosity, yield point, and gel strengths (10 seconds and 10 minutes) are presented in Table XIV.

TABLE XIV

| Example | Bingham Plastic Viscosity* (cP) | Bingham Yield Point** (lb/100 ft²)*** | Gel Strength 10 Sec | (lb/100 ft²) 10 Min |
|---|---|---|---|---|
| Example 22 | 35 (initial) | 10 | — | — |
|  | 35 (hot rolled) | 13 | 6 | 12 |
| Comparative | 39 (initial) | 15 | — | — |
| Example K | 40 (hot rolled) | 13 | 6 | 14 |

*Shear stress in excess of the yield stress that will induce unit rate of shear.
**Stress required to initiate flow.
***Stress required to initiate flow after the drilling fluid has remained quiescent for the stated time interval.

EXAMPLE 23

About 2.5 gallons of a 3.02% solids slurry of Wyoming bentonite in water which has been previously treated by cenrifugation to remove non-clay impurities and ion-exchanged to provide the clay in the sodium form is passed through a Manton-Gaulin homogenizer at 5,000 psi pressure. 662.3 Grams of this slurry is placed in a reaction vessel of a suitable size (3 liters) and diluted with 1303 ml of water. (The amount of water added to the reaction slurry is equal to an amount which will yield a clay content of 1.02%). A mixture of 11.38 grams of 80.3% active benzyl dimethyl hydrogenated tallow ammonium chloride (106 milliequivalents per 100 grams clay) and 1.38 grams sodium stearate (22.5 milliequivalents per 100 grams clay) is heated to 65° C. to allow for melting and poured into the clay slurry. The mixture is stirred for 30 minutes at 65° C. and the solids are collected on a vacuum filter. The filter cake is added to 1.0 liters of water and stirred for 30 minutes at 45° C. The washed solids are collected on a vacuum filter. The solids are forced air dried at 80° C. for 16 hours to remove residual water from the organophilic clay gellant. The dried organophilic gellant is ground using a hammer mill to achieve an average particle size of about 35 microns.

The organophilic clay gellant of this Example is loaded at a 1% by weight level in the polyester composition described in Example 2. Viscosity data for this resin system, herein described as Formulation 8, are determined with a Brookfield LVT viscometer using a No. 3 spindle. Results are presented in Table XV.

In Formulation 9, the organophilic clay gellant of this Example is loaded at a quantity of 6.0 grams to 108.18 grams of styrene monomer in a mixing container and stirred for 15 minutes at 1200 rpm with a laboratory Lightnin mixer fitted with a 2 inch diameter three-blade propeller. 485.82 grams of an unsaturated polyester formulation comprising 68.49% resin solids (Reichhold 31-001, a commercial product from Reichhold Chemicals) and 31.51% styrene is added to the mix along with 1.2 grams of 12% cobalt octoate and stirring continued for an additional 10 minutes. This provides a 1% concentration of the organophilic clay gellant in the fluid mixture. Viscosity data for Formulation 9 are determined with a Brookfield LVT viscometer using a No. 3 spindle. Results are presented in Table XV.

TABLE XV

| Formulation | Brookfield LVT Vicosities (cps) 6 RPM | 60 RPM | Thixotropic Index |
|---|---|---|---|
| Formulation 8 | 900 | 438 | 2.1 |
| Formulation 9 | 2860 | 876 | 3.3 |

Table XV shows that the incorporation of an organophilic clay gellant of this invention in a polyester composition by pregelling in styrene imparts a higher viscosity, a higher thixotropic index, and better rheology than with direct addition when the organophilic clay gellant is dried at high temperature.

The invention being thus described, it will be obvious that the same may be varied in many ways. However, such variations are not to be regarded as a departure from the spirit and scope of the invention, and all such modifications are intended to be included within the scope of the following claims.

What is claimed is:
1. A process of thickening a polyester composition comprising:
   (a) forming a pregel which is comprised of an aromatic monomer and the reaction product of
      (i) a smectite-type clay having a cation exchange capacity of at least 75 milliequivalents per 100 grams of clay;
      (ii) organic cation containing at least one lineal or branched, saturated or unsaturated alkyl group having 12 to 22 carbon atoms, at least one lineal or branched, saturated or unsaturated alkyl group having 1 to 12 carbon atoms and at least one aralkyl group having lineal or branched 1 to 12 carbons in the alkyl portion, said organic cation being in an amount ranging from about 100 to about 130% of the cation exchange capacity of the clay; and
      (iii) organic anion having a pKa less than about 11.0 in an amount such that the milliequivalent ratio of the organic cation to the organic anion is in the range of from about 3.0:1.0 to about 12:1.0 whereby at least some of the cation exchange sites of the smectite-type clay are substituted with organic cation and at least some of the organic anion forms a complex with the organic cation which is intercalated with the smectite-type clay; and
   (b) mixing the pregel with a liquid unsaturated polyester to form a thickened polyester composition wherein the reaction product is capable of being directly added into the polyester composition in order to thicken the composition and wherein the formation of the pregel yields a higher efficiency compared to said direct addition.

2. The process of claim 1 wherein the organic cation contains a benzyl group.

3. the process of claim 2 wherein the organic cation is ammonium and further contains at least one methyl group.

4. The process of claim 3 wherein the organic cation is benzyl dimethyl hydrogenated tallow ammonium.

5. The process of claim 1 wherein the organic anion is derived from at least one member selected from the group consisting of carboxylic acids, sulfonic acids and alkyl sulfates.

6. The process of claim 5 wherein the organic anion is selected from the group consisting of stearate, lauryl sulfate and mixtures thereof.

7. The process of claim 6 wherein the organic anion is stearate.

8. The process of claim 1 wherein the ratio of organic cation to organic anion is from about 4.0 to about 6.0.

9. The process of claim 1 wherein the pregel is formed under mild shearing conditions.

10. The process of claim 1 wherein the aromatic monomer is styrene.

* * * * *